Feb. 23, 1954  N. H. PREBLE ET AL  2,669,825
MOWER STRUCTURE
Filed June 27, 1949  4 Sheets-Sheet 2
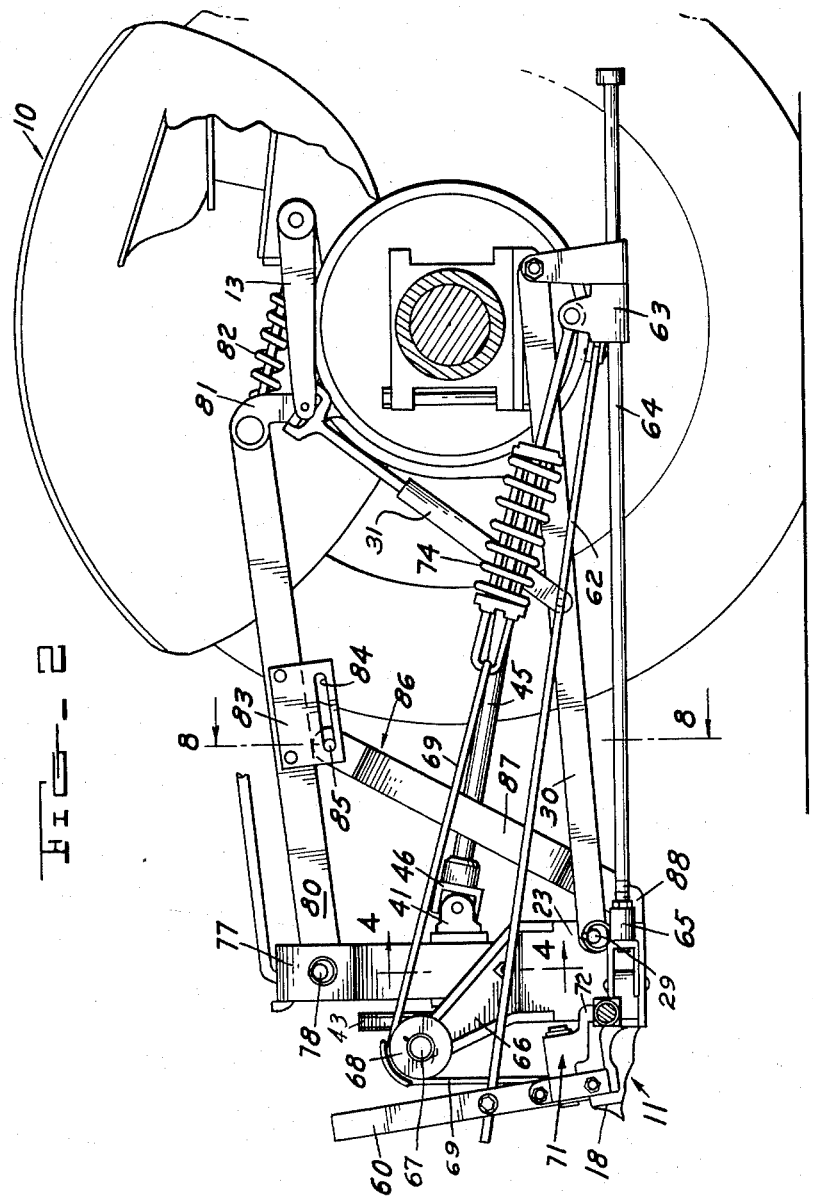
INVENTOR.
NORMAN H. PREBLE
WILLIAM A. GOSS
BY
ATTORNEYS Feb. 23, 1954  N. H. PREBLE ET AL  2,669,825
MOWER STRUCTURE
Filed June 27, 1949  4 Sheets-Sheet 3
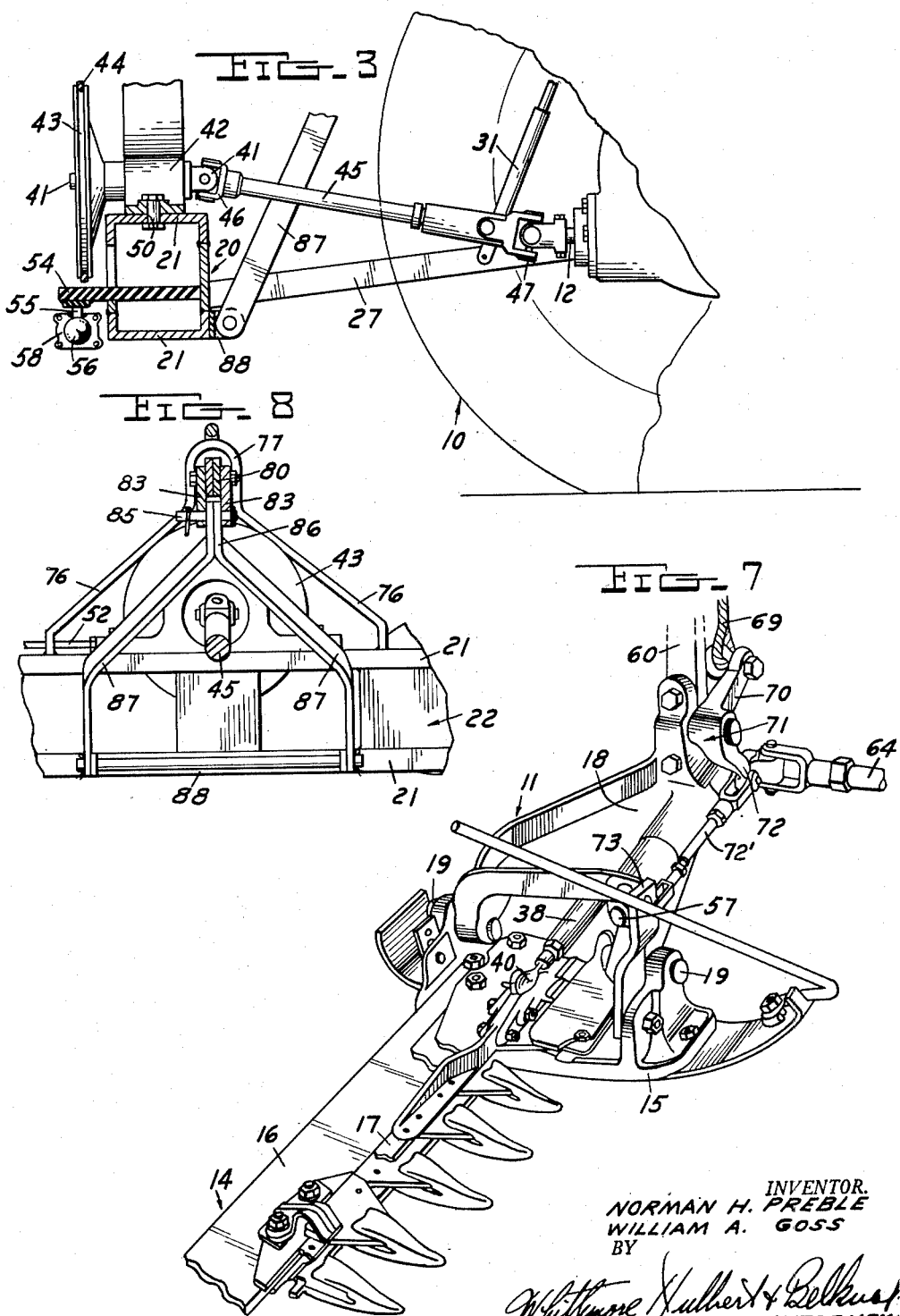
INVENTOR.
NORMAN H. PREBLE
WILLIAM A. GOSS
BY
ATTORNEYS Feb. 23, 1954 N. H. PREBLE ET AL 2,669,825
MOWER STRUCTURE
Filed June 27, 1949 4 Sheets-Sheet 4
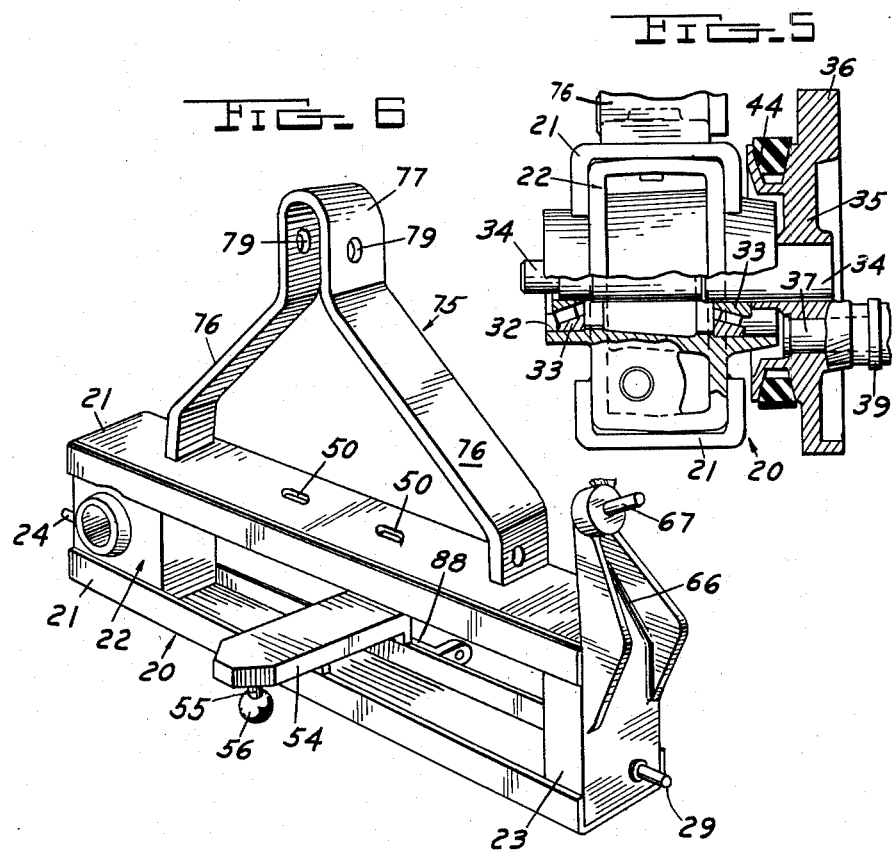
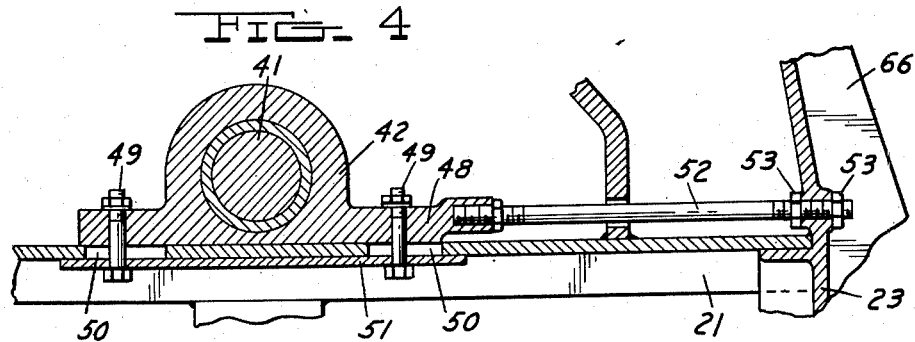
INVENTOR.
NORMAN H. PREBLE
WILLIAM A. GOSS
BY
*Whittemore Hulbert & Belknap*
ATTORNEYS Patented Feb. 23, 1954

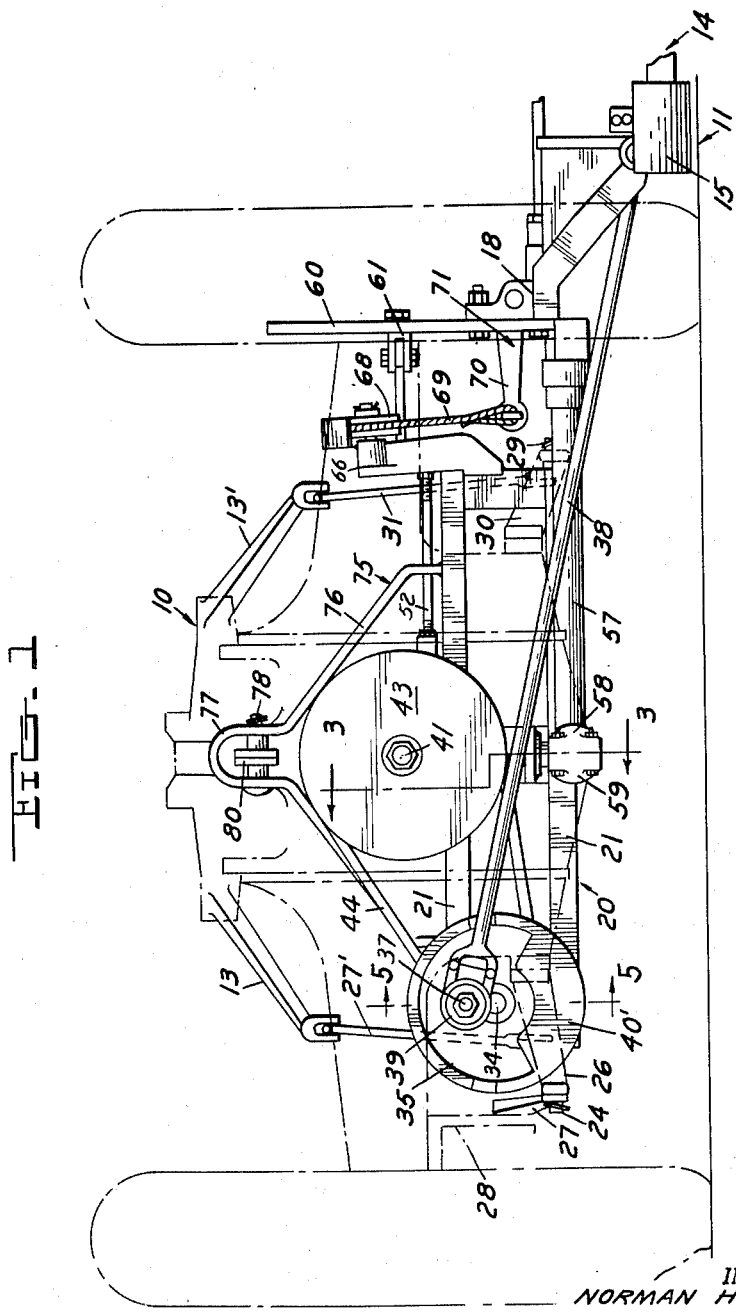

2,669,825

UNITED STATES PATENT OFFICE 2,669,825

MOWER STRUCTURE

Norman H. Preble, Detroit, Mich., and William A. Goss, Zanesville, Ohio, assignors to Detroit Harvester Company, Detroit, Mich., a corporation of Michigan Application June 27, 1949, Serial No. 101,518

5 Claims. (Cl. 56—25)

This invention relates generally to attachments for tractors, and refers more particularly to an improved drawbar for attaching a mower to a tractor.

Among the several parts of orthodox agricultural mower attachments is a cutter bar assembly having a knife or cutter supported on the cutter bar for reciprocable movement. The cutter is ordinarily operated by a pitman unit comprising a crankshaft and a rod for connecting the crank of the shaft to one end of the cutter. The pitman unit in many types of mowers is carried by the drawbar, and is removably connected to the power take-off shaft of the tractor.

The cutter is usually operated at a relatively high rate by the pitman unit, and owing to the nature of the cutting action, a vibration is set up which has a tendency to impart an objectionable shaking action to the mower. The problem of eliminating this shaking action is complicated by the necessity of providing pivotal connections between the mower attachment and tractor of a nature to permit raising or lowering the mower attachment relative to the tractor.

With the above in view it is one of the objects of this invention to materially reduce shaking of the mower attachment during operation by providing an extremely rigid drawbar having provision for supporting the crankshaft and drag bar employed for connecting the cutter bar assembly to the drawbar.

It is another object of this invention to provide a drawbar comprising opposed channel-shaped members permanently secured together in vertical spaced relation by spacers and having provision on one of the spacers for supporting the crankshaft of the pitman unit. Thus the crankshaft for reciprocating the mower knife or cutter is journalled on a drawbar which is exceptionally rigid and has a steadying influence on the mower attachment. As a result undue wear and breakage of the parts caused by shaking of the mower attachment during operation is minimized.

The foregoing as well as other objects will be made more apparent as this description proceeds, especially when considered in connection with the accompanying drawings, wherein:

Figure 1 is an end elevational view of a tractor and a mower attachment embodying the features of this invention;

Figure 2 is a side elevational view, partly in section, of the construction shown in Figure 1;

Figure 3 is a sectional view taken on the line 3—3 of Figure 1;

Figure 4 is an enlarged sectional view taken on the line 4—4 of Figure 2;

Figure 5 is an enlarged fragmentary sectional view taken on the line 5—5 of Figure 1;

Figure 6 is an enlarged perspective view of the draw-bar employed for attaching the mower to the tractor;

Figure 7 is an enlarged perspective view showing the cutter bar assembly and its mounting; and Figure 8 is a sectional view taken on the line 8—8 of Figure 2.

Referring now more in detail to the drawings, it will be noted that the reference character 10 designates a tractor, and the numeral 11 indicates a mower attachment. The tractor 10 may be of any one of a number of orthodox types having a power take-off shaft 12 and having lifting arms 13 and 13'. In accordance with conventional practice the arms 13 and 13' are power operated, and suitable hydraulic mechanism (not shown) is provided for this purpose.

The mower attachment includes a cutter bar assembly 14 which forms no part of the present invention and need not be described in detail. It will suffice to point out that the assembly 14 shown in Figure 7 of the drawings embodies an inner ground engaging shoe 15, an elongated cutter bar 16 secured at one end to the shoe 15, and a cutter or knife 17 supported on the cutter bar for reciprocation in the direction of length of the latter. Also in accordance with conventional practice, the shoe 15 is pivoted to a casting or fitting 18 by aligned pins 19 having their common axes extending normal to the cutter bar 16. The arrangement is such as to permit swinging movement of the cutter bar assembly from a position substantially parallel to the ground to an inoperative position wherein the cutter bar extends substantially vertically.

The mower attachment is connected to the tractor by a drawbar 20 which extends in a direction transverse to the tractor, and is of an extremely rigid construction. As shown particularly in Figures 4 to 6 inclusive of the drawings, the drawbar comprises elongated members 21 substantially channel-shaped in cross section and secured together in vertical spaced relationship with the channels opening toward one another by spacers 22 and 23. The spacers are respectively located in the channels of the two members, and are welded or otherwise permanently secured to the members in order to provide an exceptionally strong, rigid construction.

Secured to and extending outwardly from the spacer 22 beyond the adjacent end of the drawbar 20 is a pin 24. The pin 24 provides a pivot mounting for the rear ends of the links 26 and 27. In accordance with conventional practice the rear end of the link 26 is pivoted to the tractor to permit vertical swinging movement of the link and a rod 27' serves to pivotally connect the link 26 intermediate the ends thereof to the free end of the adjacent elevating or lift arm 13. The rear end of the link 27 is pivotally connected to a bracket 28 on the tractor in a manner to enable vertical swinging movement of the link 27, and the purpose of this link is to assist in stabilizing the mower attachment.

A pin 29 similar to the pin 24 is supported on the spacer 23 at the opposite end of the drawbar, and this pin forms a pivot mounting for the rear end of a link 30 having the front end pivotally connected to the adjacent side of the tractor. Also the link 30 is connected intermediate the ends thereof to the lower end of a link 31 having the upper end pivotally connected to the free end of the other power operated lifting arm 13'. The pins 24 and 29 are in alignment as are also the pins for connecting the front end portions of the links 26 and 30 to the tractor so that upward movement of the power operated arms 13 and 13' imparts a corresponding movement to the drawbar 20.

As shown in Figure 5 of the drawings the spacer 22 is in the form of a casting having a bore 32 therethrough and having the axis of the bore extending at right angles to the drawbar. A pair of bearings 33 are suitably secured in the bore 32 at opposite ends of the latter, and a crankshaft 34 is journalled in the bearings 33. A flywheel 35 is secured to the crankshaft 34 at the rear side of the drawbar 20, and a pulley 36 is mounted on the front face of the flywheel 35 in concentric relation to the axis of rotation of the shaft 34. Referring now to Figure 1 of the drawings, it will be noted that a pin 37 is secured to the rear side of the wheel 35 in eccentric relationship to the axis of the shaft 34, and forms the crank of the shaft 34.

The crank pin 37 is secured to the inner end of a pitman rod 38 by a suitable coupling 39, and the outer end of the pitman rod 38 is shown in Figure 7 of the drawings as having a ball and socket connection 40 with the inner end of the knife or cutter 17. It follows from the above that rotation of the crankshaft 34 imparts a reciprocable movement to the knife through the medium of the crankpin 37 and pitman rod 38. In order to minimize vibration the crank 37 and associated parts are counter-balanced by a weight 40' formed integral with the wheel 35.

The crankshaft 34 is operatively connected to the power take-off shaft 12 of the tractor and is driven by the latter. As shown in Figure 3 of the drawings, the above result is accomplished by a driven shaft 41 having its axis extending substantially parallel to the axis of the crankshaft 34 and journalled in a bearing 42. A pulley 43 is secured to the rear end of the driven shaft 41 and is connected to the pulley 36 by means of a belt 44. The pulley 43 is preferably of a diameter somewhat greater than the diameter of the pulley 36 so that the crankshaft is rotated at a speed greater than the speed of the power take-off shaft. The speed of rotation of the crankshaft 34 may vary, but in any case, should be sufficient to reciprocate the knife 17 at the rate required to effectively accomplish the mowing operation. It will also be noted from Figure 3 of the drawings that the front end of the shaft 41 is connected to the rear end of a drive shaft 45 by a universal coupling 46, and the front end of the drive shaft is connected to the power take-off shaft 12 by a universal coupling 47.

The bearing 42 is mounted directly on the top channel member 21 for sliding movement to enable adjusting the tension of the belt 44. As shown in Figure 4 of the drawings, attaching flanges 48 are provided at opposite sides of the bearing 42, and these flanges are formed with openings for receiving suitable fastener elements 49. The top channel 21 of the drawbar has elongated slots 50 formed in the base thereof for respectively receiving the fastener elements 49, and a plate 51 is supported at the underside of the base of the top channel 21 for cooperating with the fastener elements to clamp the bearing 42 in its desired adjusted position. In accordance with the present invention the bearing 42 is adjustable from a point at one end of the drawbar by a rod 52 having the inner end threadably engaging a tapped opening in the adjacent attaching portion 48 on the bearing, and having the outer end extending through an opening in the spacer 23. The outer end of the rod is threaded, and suitable lock nuts 53 are threadably mounted thereon at opposite sides of the spacer 23. Thus by manipulating the lock nuts 53, the bearing may be adjusted lengthwise of the drawbar 20 to vary the tension of the belt 44.

Welded or otherwise suitably secured to the bottom channel member 21 of the drawbar at a point between the spacers is a bracket 54. The bracket 54 projects rearwardly beyond the drawbar 20, and a fitting 55 is welded or otherwise permanently secured to the bracket at the rear side of the draw-bar. The fitting 55 extends downwardly from the bracket 54, and is fashioned with a ball or spherical portion 56. The fitting 55 provides a pivotal mounting for the inner end of the usual drag bar 57. As shown in Figure 1, the inner end of the drag bar 57 has a part 58 which cooperates with a cap 59 to form a spherical socket for bearing engagement with the ball 56. The arrangement is such that the inner end of the drag bar has a universal connection with the drawbar 20.

The outer end of the drag bar 57 is connected to the cutter bar assembly 14 in accordance with conventional practice, and this connection need not be described in detail herein. It will suffice to point out that the casting 18 shown in Figure 7 of the drawings is journalled on the outer end of the drag bar 57 to permit tilting movement of the cutter bar assembly about an axis extending in the direction of length of the cutter bar. In this connection it may also be pointed out that the cutter bar is held in any desired tilted position by a tilt lever 60 having the lower end suitably secured to the casting 18 and having a fitting 61 (Figure 1) secured thereto intermediate the ends thereof. The fitting 61 is selectively attachable to the rear end of a link 62 at different points along the length of the latter in a manner not shown herein in order to locate the cutter bar assembly 14 in the desired tilted position. The front end of the link 62 is shown in Figure 2 as pivoted to a spring operated safety device 63, which in turn, is releasably connected to a pull bar 64 having the rear end pivoted to the cutter bar assembly by a coupling 65. The safety device forms no part of the present invention, and accordingly, is not shown in detail. However, the purpose of this device is to permit the drag bar 57 to swing the cutetr bar assembly 14 rearwardly in the event the cutter strikes an obstruction during the mowing operation.

The spacer 23 is also in the form of a casting and is provided with an upwardly projecting extension 66 shown in Figures 2, 4 and 6 of the drawings. The extension 66 has a pin 67 at the upper end thereof and a pulley 68 (Figure 2) is rotatably supported on the pin 67. A cable 69 is reeved over the pulley 68, and the lower end of the cable is connected to one arm 70 of a bell crank lever 71. As shown in Figure 7 of the drawings the other arm 72 of the bell crank lever 71 is pivotally connected to one end of a link 72' having the opposite end pivotally connected to the upper end of a bracket 73. The lower end of the bracket 73 is connected to the inner shoe 15. The other end of the cable 69 is connected to the safety device 63 through the medium of a spring 74. The spring 74 applies a pull on the cable 69 in a forward direction, and serves to counterbalance the weight of the cutter bar assembly. The specific construction of the counterbalancing spring arrangement forms the subject matter of the Aram Abgarian pending application Serial No. 665,766, filed April 29, 1946, now Patent No. 2,580,266, and need not be described in detail herein.

Referring to Figures 1 and 6 of the drawings, it will be noted that a yoke 75 extends upwardly from the top channel member 21 of the drawbar, and is substantially V-shaped. The legs 76 of the yoke are respectively welded or otherwise permanently secured to the top channel member 21 adjacent opposite ends thereof, and the upper end of the yoke is fashioned to provide a loop 77. A pin 78 extends through aligned openings 79 in the looped portion 77, and provides a pivotal mounting for the rear end of a link 80. The front end of the link 80 is pivotally connected to the upper end of a second link 81 having the rear end pivoted to a part of the tractor in the manner shown in Figure 2 of the drawings. Also in accordance with conventional practice the front end of the link 80 is connected to the tractor by a suitable coil spring 82, and the purpose of this spring is to prevent abnormal thrusts on the mower attachment from being transmitted to the tractor.

It will further be noted from Figure 8 of the drawings that plates 83 are secured to opposite sides of the link 80 intermediate the ends thereof, and are formed with slots 84 which are elongated in the general direction of length of the link 80. A pin 85 extends through the slots 84 in the plates 83 and is slidable longitudinally of the slots 84. The pin 85 provides a pivotal mounting for the upper end of a yoke 86 having diverging arms 87 extending downwardly and rearwardly from the plates 84. The lower ends of the arms 87 are respectively pivoted to a bracket 88, and the latter is permanently secured to the bottom channel member 21 of the drawbar 20. The purpose of the yoke 86 is to assist in stabilizing the drawbar.

It follows from the foregoing that we have provided a drawbar structure for attaching a mower to a tractor wherein provision is made to support a number of the parts of the mower assembly directly on the drawbar. More specifically it will be noted that the crankshaft 34 of the pitman unit is journalled directly on the drawbar, the inner end of the drag bar 57 is universally connected directly to the drawbar, the supporting pulley 68 for the counterbalancing means 74 is journalled directly on the drawbar, the driven shaft 41 for the crankshaft 34 is also journalled directly on the drawbar, and the various stabilizing elements are connected directly to the drawbar. It will also be noted that the drawbar structure is of a nature to provide extreme rigidity, and to take the stresses resulting from operation of the mower without causing undue shaking of the mower attachment.

What we claim as our invention is:

1. Tractor mounted mower structure comprising an elongated drawbar adapted to be mounted at the rear of a tractor, mowing mechanism movably carried by the drawbar, drive mechanism for the mowing mechanism including a drive shaft carried by said drawbar, lift links pivotally secured to the ends of the drawbar and extending forwardly therefrom for connection to a tractor, said drawbar having an upwardly extending arm intermediate its ends, a stabilizing link pivotally secured to the upper end of said arm and extending forwardly therefrom for connection to the tractor, a stabilizing yoke, the upper end of said yoke being slidably connected to an intermediate portion of the stabilizing link, said yoke comprising a pair of downwardly and rearwardly extending diverging arms, and means pivotally connecting the lower ends of said arms to laterally spaced points on the lower portion of said drawbar.

2. A drawbar assembly for connection to a tractor having rearwardly extending lift arms, said drawbar assembly comprising an elongated drawbar adapted to be disposed rearwardly of the tractor and transversely of the longitudinal axis thereof, linkage connected to opposite ends of the drawbar and extending forwardly therefrom for pivotal connection to the tractor and to the lift arms thereof, an arm extending upwardly from said drawbar, a first link extending forwardly from said arm, a second link pivoted to said first link and adapted to be pivotally connected to a fixed pivot on the tractor, spring means connected at one end to the forward end of said first link and adapted to be connected to a fixed point on the tractor, a slotted plate intermediate the ends of said first link, and a yoke having at its end a pin slidable in the slot in said plate, said yoke having diverging arms extending downwardly and rearwardly from said plate and having their lower ends pivotally secured to the lower portion of said drawbar.

3. A drawbar assembly comprising a drawbar having an upwardly extending arm intermediate its ends, linkage connected to the ends of said drawbar for raising and lowering the same, a link extending forwardly from said arm for pivotal connection to a tractor, a yoke having an upper part slidably connected to said link intermediate the ends thereof and having a pair of downwardly and rearwardly extending diverging arms, and means pivotally connecting the lower ends of said arms to said drawbar at points spaced substantially from the center thereof.

4. A drawbar having a pair of vertically movable lifting links pivoted to the ends thereof, said drawbar having an upwardly extending arm intermediate its ends, a stabilizing link pivotally secured at one end to said arm and extending forwardly therefrom for connection to a tractor, and a stabilizing yoke slidably connected to said link intermediate its ends and having a pair of downwardly and rearwardly extending arms pivotally secured to said drawbar at points spaced substantially from the center thereof.

5. In combination with a tractor and a mower attachment, an elongated drawbar positioned between the tractor and mower attachment and extending in a direction transverse to the longitudinal axis of the mower, a pair of lift links pivotally connected at their forward ends to the tractor and pivotally connected at their rear ends to the ends of said drawbar to provide for substantially vertical swinging movement of said draw bar, power means on the tractor for raising and lowering said pair of links, a first yoke having depending laterally spaced arms rigidly connected to said drawbar adjacent the ends thereof, a stabilizing link pivotally connected at its rear end to the upper end of said first yoke, resilient means connecting the forward end of said lift link to said tractor substantially above the pivot connection between said tractor and said pair of links, a second yoke having depending laterally spaced arms pivotally connected to said drawbar adjacent the ends thereof, and means providing a pin and slot connection between the upper end of said second yoke and an intermediate portion of said stabilizing link.

NORMAN H. PREBLE.
WILLIAM A. GOSS.

References Cited in the file of this patent

UNITED STATES PATENTS

| Number | Name | Date |
|---|---|---|
| 1,353,986 | Bergendorf | Sept. 28, 1920 |
| 1,455,493 | John | May 14, 1923 |
| 1,626,441 | Wermer | Apr. 26, 1927 |
| 1,915,548 | Paul | June 27, 1933 |
| 2,282,267 | Swenson et al. | May 5, 1942 |
| 2,335,510 | Hansen | Nov. 30, 1943 |
| 2,341,807 | Olmstead et al. | Feb. 15, 1944 |
| 2,354,710 | Simpson | Aug. 1, 1944 |
| 2,454,697 | Hilblom | Nov. 23, 1948 |
| 2,465,641 | Gardner | Mar. 29, 1949 |
| 2,502,805 | Spurlin | Apr. 4, 1950 |
| 2,503,605 | Abgarian | Apr. 11, 1950 |
| 2,550,412 | Girardi | Apr. 24, 1951 |